(12) United States Patent
Gavrylyuk et al.

(10) Patent No.: US 11,250,058 B2
(45) Date of Patent: Feb. 15, 2022

(54) PROVIDING AN EASILY NAVIGABLE VISUAL REPRESENTATION OF A GRAPH

(71) Applicant: Microsoft Technology Licensing, LLC, Redmond, WA (US)

(72) Inventors: Kyrylo Gavrylyuk, Seattle, WA (US); Laurent An Minh Nguyen, Lausanne (CH); Monil Kiran Dalal, Bothell, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 692 days.

(21) Appl. No.: 15/898,418

(22) Filed: Feb. 16, 2018

(65) Prior Publication Data
US 2019/0258745 A1 Aug. 22, 2019

(51) Int. Cl.
| | |
|---|---|
| *G06F 16/20* | (2019.01) |
| *G06F 16/901* | (2019.01) |
| *G06F 3/0484* | (2022.01) |
| *G06F 16/23* | (2019.01) |
| *G06F 16/904* | (2019.01) |
| *G06F 16/9038* | (2019.01) |
| *G06F 9/451* | (2018.01) |

(52) U.S. Cl.
CPC ...... *G06F 16/9024* (2019.01); *G06F 3/04842* (2013.01); *G06F 16/23* (2019.01); *G06F 16/904* (2019.01); *G06F 16/9038* (2019.01); *G06F 9/451* (2018.02)

(58) Field of Classification Search
None
See application file for complete search history.

(56) References Cited

U.S. PATENT DOCUMENTS

| | | | | |
|---|---|---|---|---|
| 6,628,304 | B2 * | 9/2003 | Mitchell | G06F 3/0481 715/734 |
| 7,392,488 | B2 * | 6/2008 | Card | G06F 16/954 715/853 |
| 8,694,980 | B2 * | 4/2014 | Rosu | G06F 16/9024 717/156 |
| 2011/0307460 | A1 * | 12/2011 | Vadlamani | G06F 16/951 707/706 |
| 2012/0317149 | A1 * | 12/2012 | Jagota | G06F 16/9024 707/798 |

\* cited by examiner

*Primary Examiner* — Belix M Ortiz Ditren
(74) *Attorney, Agent, or Firm* — Ray Quinney & Nebeker; Tiffany Healy (57) ABSTRACT

A method for providing a visual representation of a graph may include displaying a current node of interest. The current node of interest may include a first plurality of neighbor nodes. A subset of the first plurality of neighbor nodes may be displayed with the current node of interest. Links connecting the subset of the first plurality of neighbor nodes to the current node of interest may also be displayed. The method may also include displaying a user interface element that facilitates navigation to additional neighbor nodes that correspond to the current node of interest but are not currently displayed.

16 Claims, 12 Drawing Sheets

PROVIDING AN EASILY NAVIGABLE VISUAL REPRESENTATION OF A GRAPH

CROSS-REFERENCE TO RELATED APPLICATIONS

N/A

BACKGROUND

In mathematical terms, a graph is a collection of elements. These elements, which are typically referred to as nodes (or vertices), are joined together by links (or edges). Each node represents an entity to which information can be attached, whereas each link represents a relationship between entities. Information may also be attached to links. Graphs are extremely useful in understanding a wide diversity of datasets.

A database is an organized collection of data. A graph database is a type of database in which one or more graphs are used to model the structural relationships between data objects in a dataset. Graph databases use nodes, links, and properties (or attributes) to represent and store data objects. Generally speaking, the nodes in a given graph represent instances of entities such as people, businesses, accounts, or any other item of interest. The links in the graph represent the connections or relationships that exist between pairs of nodes. Data related to the nodes may be stored as properties of the nodes, whereas data related to the links may be stored as properties of the links.

Graph databases enable users to leverage complex and dynamic relationships in highly connected data (i.e., data whose interpretation and value requires an understanding of the ways in which its constituent elements are related) in order to generate insight and competitive advantage. Graph databases have helped solve important problems in a number of technical areas, including social networking, master data management, fraud detection, recommendation engines, and bioinformatics applications.

SUMMARY

A method for providing a visual representation of a graph is disclosed. In accordance with the method, a current node of interest may be displayed. The current node of interest may include a first plurality of neighbor nodes. A subset of the first plurality of neighbor nodes may be displayed with the current node of interest. Links connecting the subset of the first plurality of neighbor nodes to the current node of interest may also be displayed. The method may also include displaying a user interface element that facilitates navigation to additional neighbor nodes that correspond to the current node of interest but are not currently displayed.

The user interface element may provide information about the subset of the first plurality of neighbor nodes. The user interface element may include a navigation component, and user activation of the navigation component may change the subset of the first plurality of neighbor nodes that are displayed. In some embodiments, a neighbor node indicator may be displayed next to each neighbor node of the current node of interest that includes one or more of its own neighbor nodes.

The current node of interest may be displayed in a central portion of a user interface screen. If user input is received selecting a neighbor node of the current node of interest as a new node of interest, the selected neighbor node may be moved to the central portion of the user interface screen. The new node of interest may include a second plurality of neighbor nodes. The subset of the first plurality of neighbor nodes may be removed from the visual representation, and a subset of the second plurality of neighbor nodes may be displayed with the new node of interest. An animated sequence may be used to remove the subset of the first plurality of neighbor nodes and to display the subset of the second plurality of neighbor nodes. The user interface element may be updated to provide information about the subset of the second plurality of neighbor nodes. In some embodiments, the method may include continuing to display previous nodes of interest when the visual representation is changed to a new node of interest.

A computer system configured to provide a visual representation of a graph is disclosed. The computer system may include one or more processors and memory comprising instructions that are executable by the one or more processors to perform certain operations. The operations may include displaying a current node of interest. The current node of interest may include a first plurality of neighbor nodes. The operations may also include displaying a subset of the first plurality of neighbor nodes with the current node of interest. The operations may also include displaying links connecting the subset of the first plurality of neighbor nodes to the current node of interest. The operations may also include displaying a user interface element that facilitates navigation to additional neighbor nodes that correspond to the current node of interest but are not currently displayed.

A computer-readable medium having computer-executable instructions stored thereon is also disclosed. When executed, the instructions cause one or more processors to perform certain operations. The operations may include displaying a current node of interest. The current node of interest may include a first plurality of neighbor nodes. The operations may also include displaying a subset of the first plurality of neighbor nodes with the current node of interest. The operations may also include displaying links connecting the subset of the first plurality of neighbor nodes to the current node of interest. The operations may also include displaying a user interface element that facilitates navigation to additional neighbor nodes that correspond to the current node of interest but are not currently displayed.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of implementations of the disclosure will be set forth in the description that follows, and in part will be apparent from the description, or may be learned by the practice of the teachings herein. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, similar reference numbers have been used for similar features in the various embodiments. Unless indicated otherwise, these similar features may have the same or similar attributes and serve the same or similar functions. Understanding that the drawings depict some examples of embodiments, the embodiments will be described and explained with additional specificity and detail through the use of the accompanying drawings in which.

DETAILED DESCRIPTION

As indicated above, graph databases use nodes, links, and properties. Nodes represent entities such as people, businesses, accounts, or any other item of interest. Links connect nodes to other nodes, and they represent some relationship between them. Properties represent particular information about nodes or links. Meaningful patterns may emerge when examining the connections and interconnections of nodes, links, and properties.

Graph databases allow simple and fast retrieval of complex hierarchical structures that may be difficult to model in relational systems. With relational databases, join-intensive query performance tends to deteriorate as the dataset gets larger. In contrast, with a graph database performance tends to remain relatively constant, even as the dataset grows. This is because queries of graph databases are typically localized to a portion of the graph, so that the execution time for each query is proportional only to the size of the part of the graph that was traversed to satisfy the query, rather than the size of the overall graph. As a result, graph databases are increasingly being used to model large, complicated datasets.

As the data being represented in graph databases increases in size and complexity, queries to graph databases may return an extremely large number of nodes (e.g., tens of thousands of nodes or even more). Consequently, it may be difficult to identify any meaningful information from a visual representation of the query results.

Figure 1:
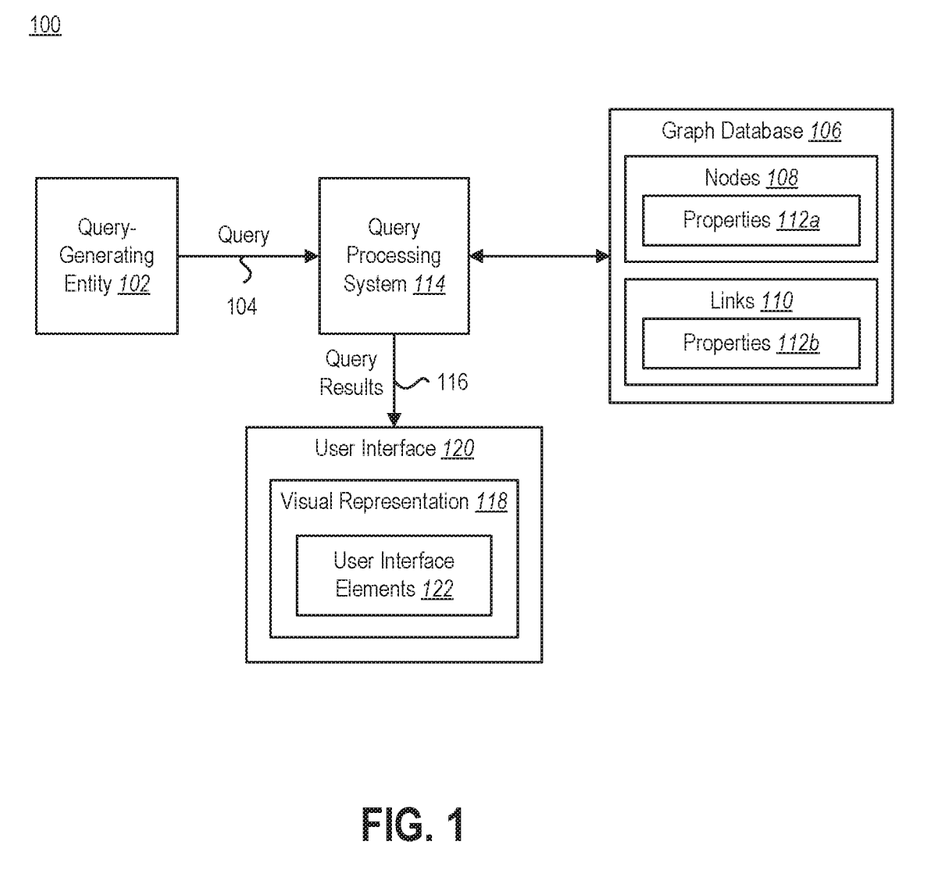
FIG. 1 is a block diagram that illustrates an example of a system in which aspects of the present disclosure may be utilized.

The present disclosure is generally related to improved techniques for providing visual representations of a graph. FIG. 1 is a block diagram that illustrates an example of a system 100 in which aspects of the present disclosure may be utilized. The system 100 includes a query-generating entity 102, which may include a device, a computer program, or some other hardware-based or software-based entity that is capable of generating a query 104 to be applied to a graph database 106. The graph database 106 may define a plurality of nodes 108 and links 110 that connect nodes 108 to one another. The nodes 108 may include properties 112a, and the links 110 may include properties 112b.

The query-generating entity 102 may be in electronic communication with a query processing system 114 and may be operable to submit the query thereto. The query processing system 114 may be configured to receive the query 104 from the query-generating entity 102 and execute the query 104 against a graph database 106 to obtain query results 116. The query results 116 may include data responsive to the query 104. In particular, the query results 116 may include nodes 108, links 110, and properties 112a-b that satisfy the query 104.

A visual representation 118 of the query results 116 may be generated and displayed via a user interface 120. The visual representation 118 may be dynamic. For example, the visual representation 118 may include one or more user interface elements 122 that enable a user to interact with the visual representation 118. Consequently, the visual representation 118 of the query results 116 may change in response to user input.

For purposes of example, FIG. 1 shows the visual representation 118 in the context of query results 116 from a graph database 106. However, the scope of the present disclosure should not be limited to this specific context. The visualization techniques disclosed herein may be applied in a variety of other contexts. For example, the techniques disclosed herein may be applied to visually represent a graph that is loaded from a file.

Figure 1A:
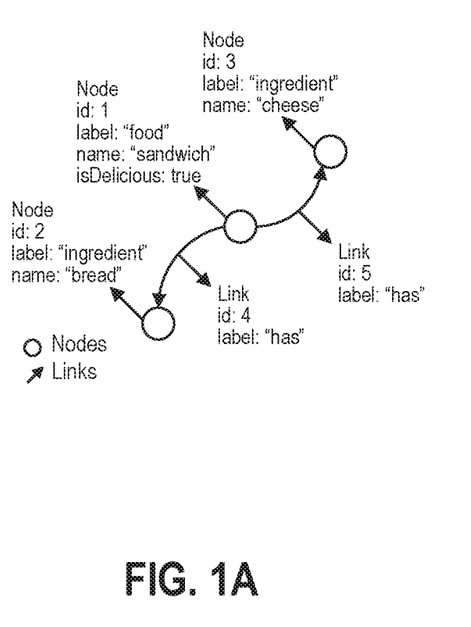
FIG. 1A illustrates different elements of a graph.

FIG. 1A illustrates different elements of a graph. As indicated above, a graph may include nodes (or vertices) and links (or edges). Nodes may represent objects, and links may represent relationships between objects.

As indicated above, the nodes 108 may include properties 112a, and the links 110 may include properties 112b. The properties 112a-b may take the form of key-value pairs that may include different types of values (e.g., string, Boolean, number). In addition, in some embodiments, the nodes 108 and the links 110 may also include other types of attributes, such as identifiers and labels. Identifiers may uniquely identify each element (node or link) of a graph. Labels may include unique string elements that may be used to identify types of objects (nodes or links).

FIGS. 2A-F illustrate examples of user interface screens 224a-g that may be displayed in connection with presenting the visual representation 118 of the query results 116. Reference is initially made to the user interface screen 224a shown in FIG. 2A. A plurality of nodes 208 are displayed. These nodes 208 (and other nodes as well) are included among the query results 116 that have been returned. A node 208a has been selected (e.g., via user input) to be the node of interest 208a. The node of interest 208a is shown in a central portion of the user interface screen 224a.

Generally speaking, in a graph database 106, two nodes 208 are considered to be neighbors if they are connected to one another via a link 210. The user interface screen 224a shown in FIG. 2A shows a plurality of neighbor nodes 208 that are connected to the node of interest 208a via links 210.

Figure 2A:
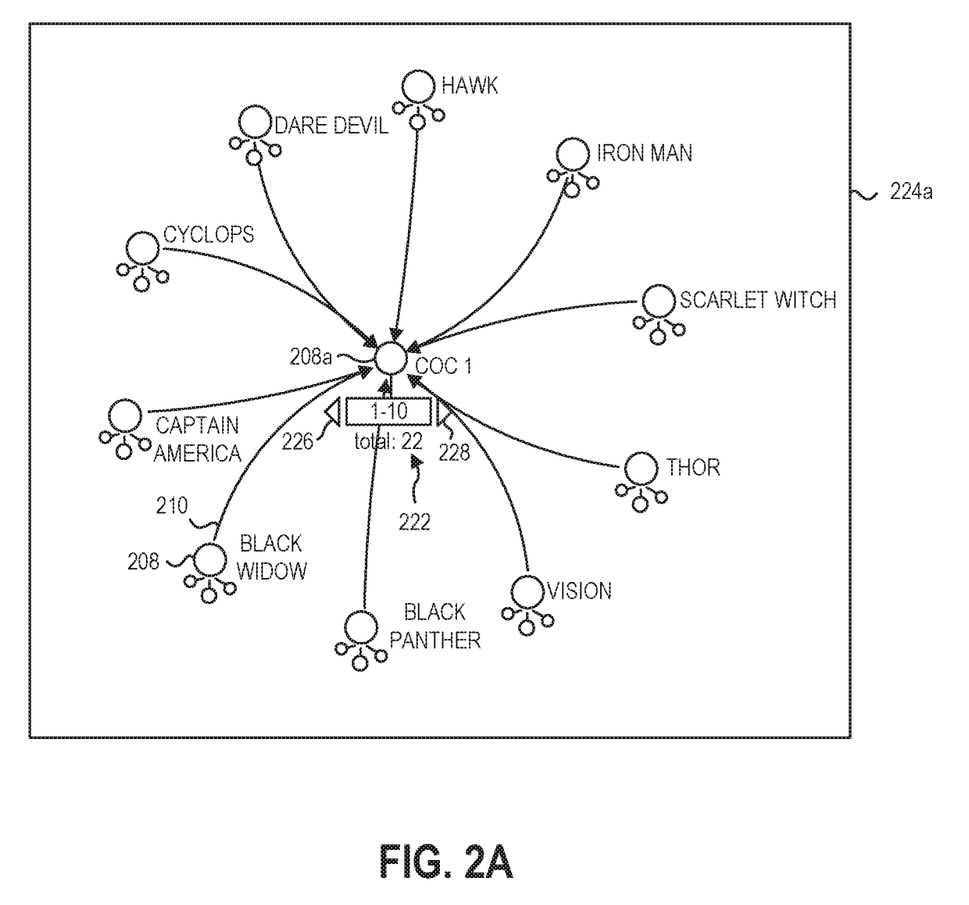
FIGS. 2A-F illustrate examples of user interface screens that may be displayed in connection with presenting a visual representation of the query results.

The neighbor nodes 208 that are shown in FIG. 2A are only a subset of the total number of neighbor nodes 208 corresponding to the node of interest 208a. For the sake of simplicity, in the depicted example it will be assumed that the node of interest 208a includes a total of 22 neighbor nodes 208. However, in a graph database 106 that models large, complicated datasets, a node of interest 208a may include an extremely large number of neighbor nodes 208 (e.g., tens of thousands or more). If all of the neighbor nodes 208 corresponding to a particular node of interest 208a were displayed at the same time, it would be very difficult for the user to identify meaningful information from the visual representation 118 of the query results 116.

To address this problem, a visual representation 118 in accordance with the present disclosure may display only a subset of the neighbor nodes 208 that correspond to the node of interest 208a at any given time. In other words, a maximum number of neighbor nodes 208 ($N_{max}$) may be defined, and the visual representation 118 may only display $N_{max}$ neighbor nodes 208 at any given time. If the number of neighbor nodes 208 corresponding to the node of interest 208a is less than $N_{max}$, then all of the neighbor nodes 208 may be displayed with the node of interest 208a. If, however, the number of neighbor nodes 208 corresponding to the node of interest 208a is greater than $N_{max}$, then only $N_{max}$ neighbor nodes 208 may be displayed at a time. In the depicted example, $N_{max}$=10. Therefore, although the node of interest 208a includes a total of 22 neighbor nodes 208, only 10 of those neighbor nodes 208 are displayed at a time.

The visual representation 118 includes a user interface element 222 that provides information about the subset of neighbor nodes 208 that are currently being displayed. In the depicted example, the user interface element 222 indicates which neighbor nodes 208 are currently being displayed (neighbor nodes 1-10), as well as the total number of neighbor nodes 208 that correspond to the node of interest 208a (22).

The user interface element 222 also facilitates navigation to the additional neighbor nodes 208 that correspond to the current node of interest 208a but are not currently displayed. In the depicted example, the user interface element 222 includes a left arrow 226 and a right arrow 228. In the user interface screen 224a that is shown in FIG. 2A, the first set of $N_{max}$ neighbor nodes 208 (neighbor nodes 1-10) are currently being displayed. User activation of the right arrow 228 changes the visual representation 118 so that the next set of $N_{max}$ neighbor nodes 208 (neighbor nodes 11-20) are displayed.

If the first set of $N_{max}$ neighbor nodes 208 are displayed (as in FIG. 2A), user activation of the left arrow 226 may change the visual representation 118 so that the last set of $N_{max}$ neighbor nodes 208 are displayed. Alternatively, if the first set of $N_{max}$ neighbor nodes 208 are displayed, the left arrow 226 may be disabled or not displayed at all.

In some embodiments, the user interface element 222 may include a different type of navigation component, such as a scrollbar. Alternatively, in embodiments where the visual representation 118 is being presented on a touchscreen display, it may not be necessary for the user interface element 222 to include a navigation component. Instead, the user interface element 222 may simply provide information about which neighbor nodes 208 are currently being displayed, and the user may touch the display in a certain way (e.g., by swiping right or left) to change which neighbor nodes 208 are displayed.

Figure 2B:
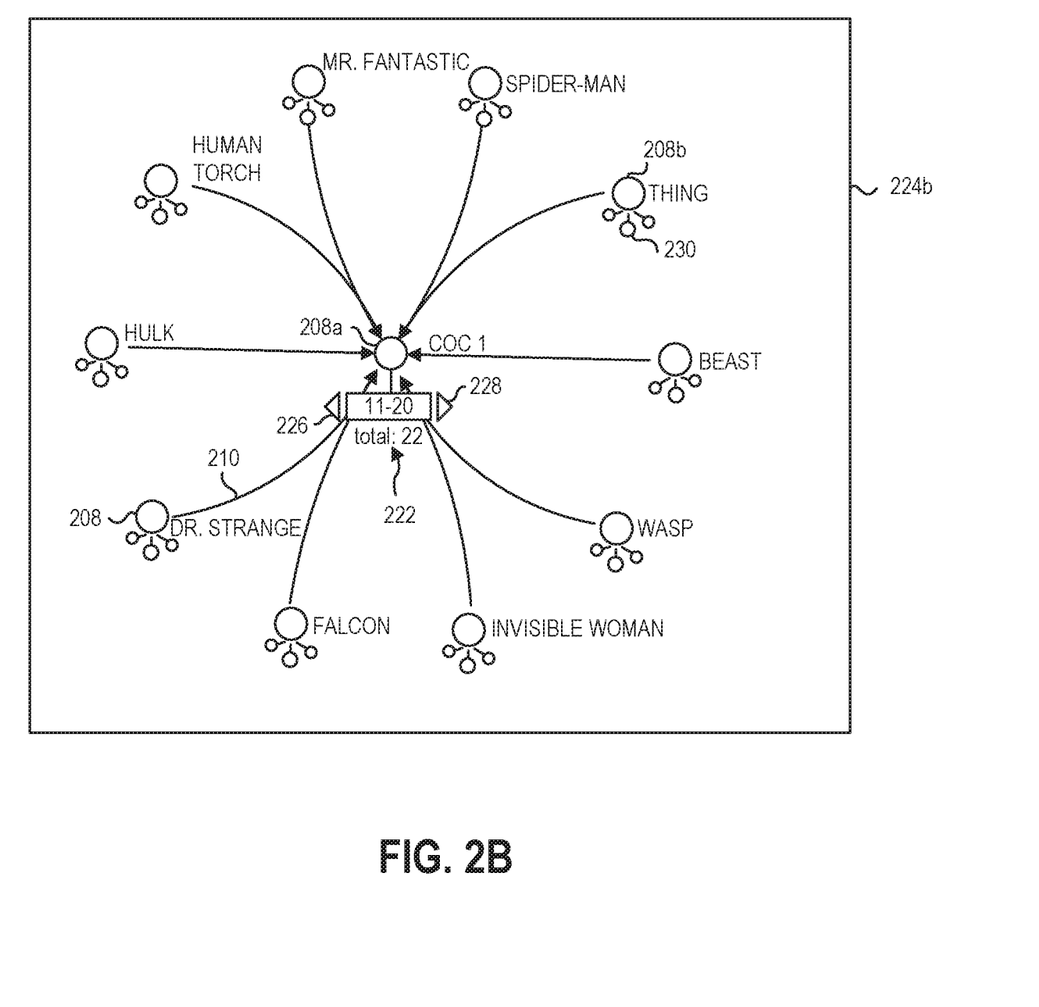

Reference is now made to the user interface screen 224b shown in FIG. 2B, which shows how the visual representation 118 changes in response to user activation of the right arrow 228. The first set of $N_{max}$ neighbor nodes 208 (neighbor nodes 1-10) are no longer displayed, and the next set of $N_{max}$ neighbor nodes 208 (neighbor nodes 11-20) are displayed. The links 210 that connect the neighbor nodes 208 to the node of interest 208a are also displayed.

At least some of the neighbor nodes 208 corresponding to the current node of interest 208a may have their own neighbor nodes 208. A neighbor node indicator 230 may be displayed next to each neighbor node 208 that corresponds to the current node of interest 208a and that includes one or more of its own neighbor nodes 208.

A user may decide that she is interested in learning more about a neighbor node 208b that corresponds to the current node of interest 208a. The user may select a neighbor node 208b of the current node of interest 208a to become the new node of interest 208b. For example, if the user selects the neighbor node 208b named THING, then the THING node 208b becomes the new node of interest 208b. The user may select a neighbor node 208b by clicking on or otherwise activating the neighbor node 208b in the visual representation 118.

Figure 2C:
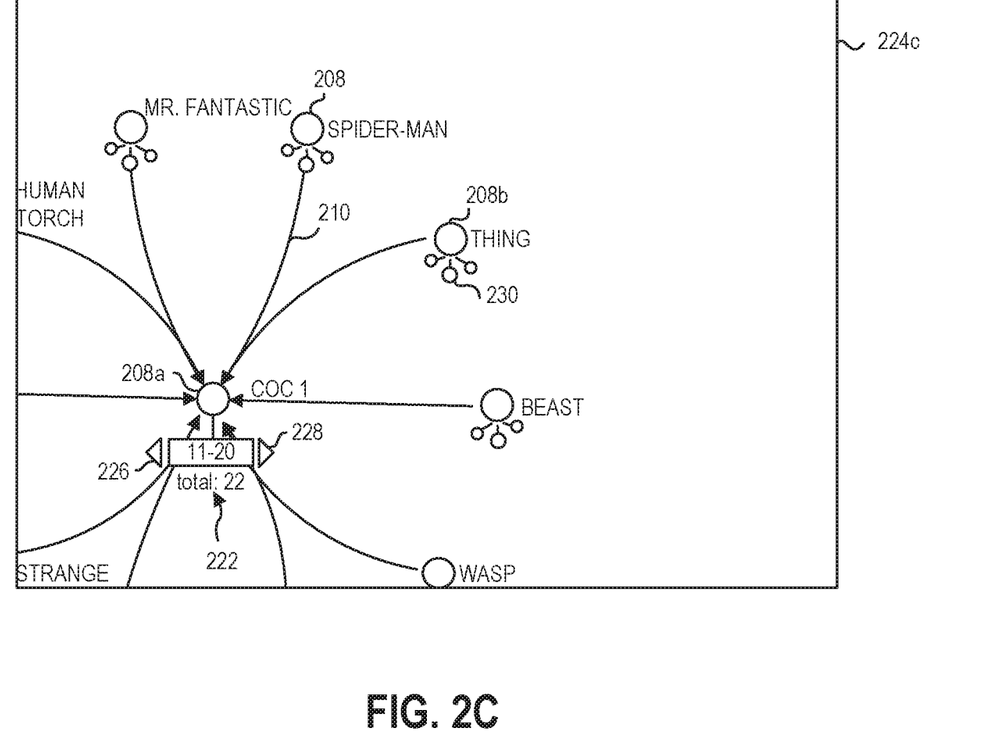
Figure 2D:
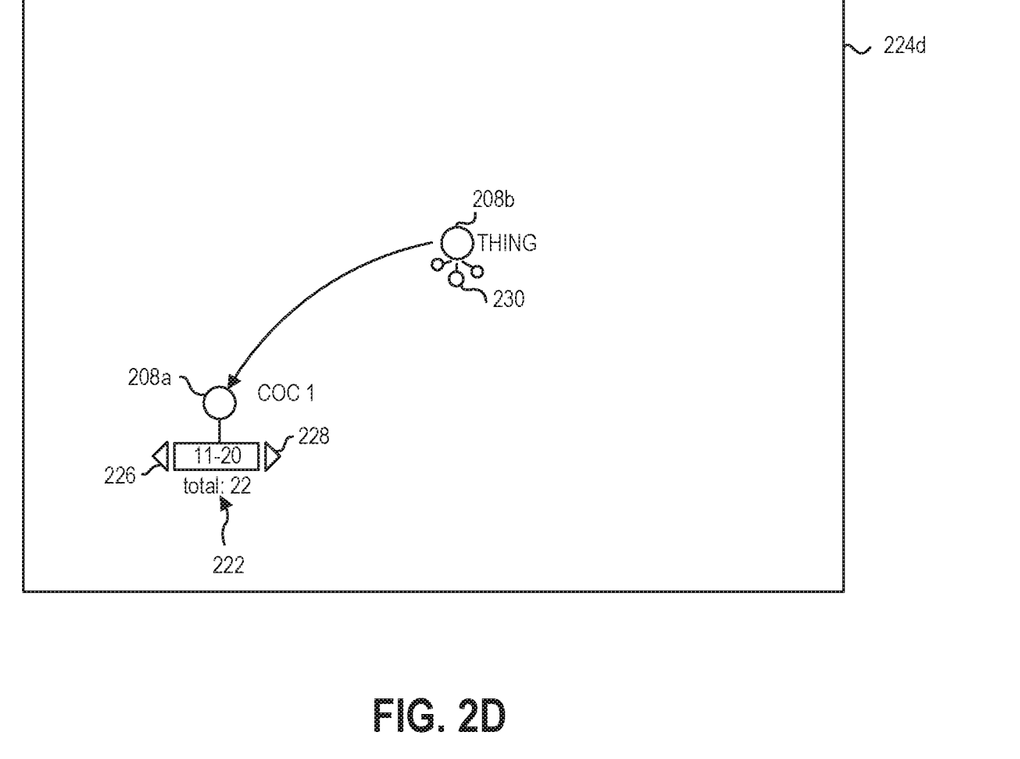
Figure 2E:
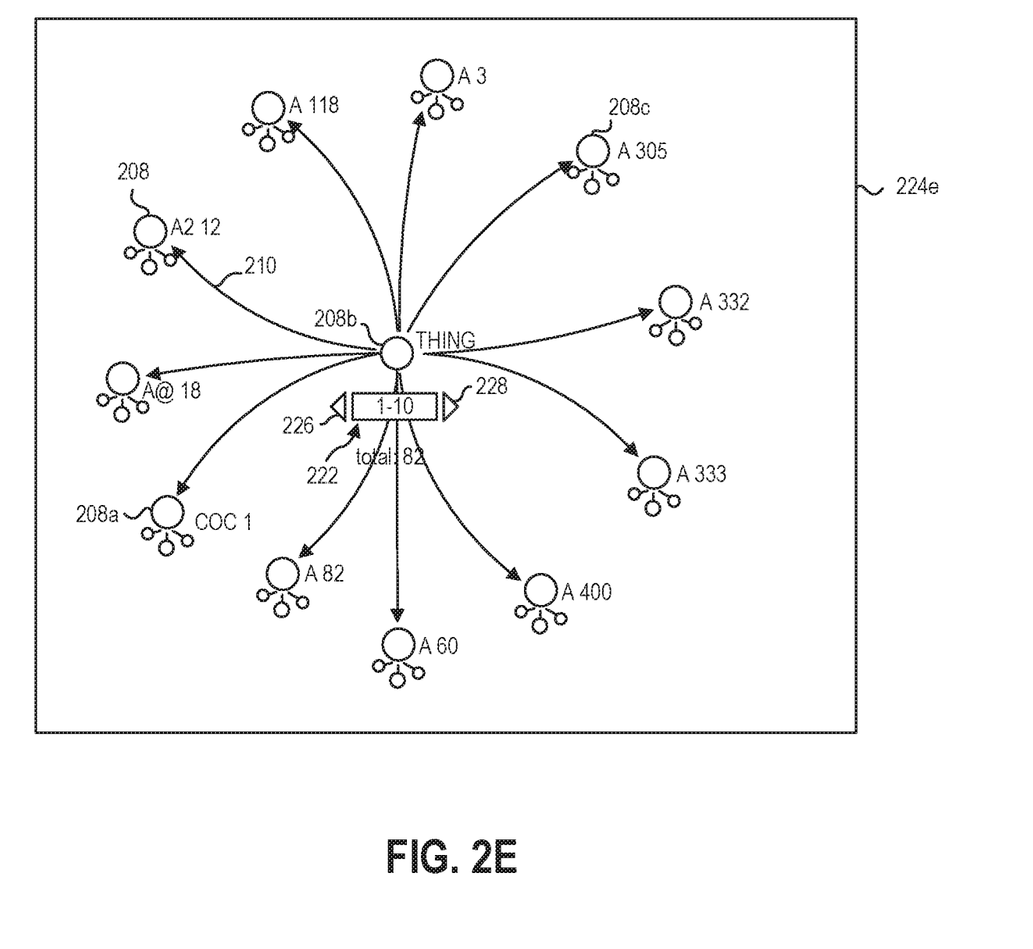

The user interface screens 224c-e shown in FIGS. 2C-E show an example of a transition from a current node of interest 208a (COC 1) to a new node of interest 208b (THING). Reference is initially made to the user interface screen 224c shown in FIG. 2C. In response to receiving user input selecting a neighbor node 208b of the current node of interest 208a as a new node of interest 208b, the selected neighbor node 208b may be moved to the central portion of the user interface screen 224c.

Next, as shown in FIG. 2D, the neighbor nodes 208 corresponding to the previous node of interest 208a (i.e., neighbor nodes 1-10) may be removed from the visual representation 118. Then, as shown in FIG. 2E, no more than $N_{max}$ of the neighbor nodes 208 corresponding to the new node of interest 208b may be displayed with the new node of interest 208b. In some embodiments, the transition shown in FIGS. 2D-E may involve an animated sequence. The neighbor nodes 208 corresponding to the previous node of interest 208a (i.e., the neighbor nodes 208 that are being removed) may be faded out, and the new neighbor nodes 208 (i.e., the neighbor nodes 208 corresponding to the new node of interest 208b) may be created around the new node of interest 208b. Then, the new neighbor nodes 208 may be moved away from the new node of interest 208b (e.g., similar to a firework) in order to emphasize that the new neighbor nodes 208 are neighbors of the new node of interest 208b.

If the number of neighbor nodes 208 of the new node of interest 208b is less than or equal to $N_{max}$, then all of the neighbor nodes 208 corresponding to the new node of interest 208b may be displayed with the new node of interest 208b. If, however, the new node of interest 208b includes more than $N_{max}$ neighbor nodes 208, then a subset of the neighbor nodes 208 corresponding to the new node of interest 208b may be displayed with the new node of interest 208b. The user interface element 222 may also be displayed, in order to facilitate navigation to additional neighbor nodes 208 that correspond to the new node of interest 208b but are not currently displayed. The information provided by the user interface element 222 may be updated to correspond to the new node of interest 208b. In the depicted example, the total number of neighbor nodes 208 has been updated from 22 (corresponding to the previous node of interest 208a) to 82 (corresponding to the current node of interest 208b).

The process shown in FIGS. 2C-E may be repeated each time the user selects a neighbor node 208 to become a new node of interest 208b. In order to help the user keep track of where she has previously been, the visual representation 118 may continue to display some or all of the previous nodes of interest 208a when the visual representation 118 is changed to a new node of interest 208b.

Figure 2F:
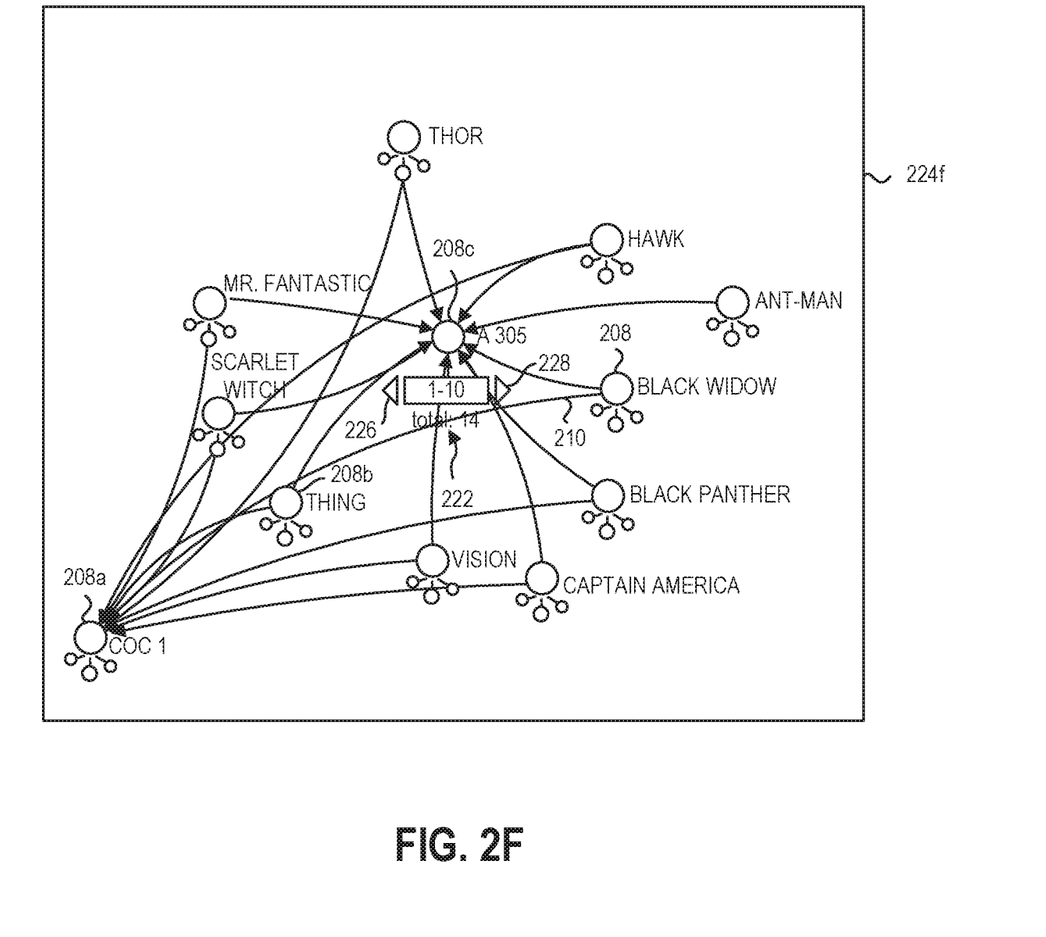

For example, referring to the user interface screen 224e shown in FIG. 2E, suppose that the user selects the node 208c named A 305 to become the new node of interest 208c. The process shown in FIGS. 2C-E may be repeated in order to change the visual representation 118. The resulting changed visual representation 118 is shown in FIG. 2F, in which the A 305 node 208c is in the central portion of the user interface screen 224f and a subset of the neighbor nodes 208 corresponding to the A 305 node 208c are displayed, along with links 210 connecting the neighbor nodes 208 to the A 305 node 208c. In addition, the previous nodes of interest 208a-b (namely, the THING node 208b and the COC 1 node 208a) are also displayed. Continuing to display the previous nodes of interest 208a-b in this manner may help the user to be able to more easily traverse the visual representation 118 of the query results 116.

Figure 3:
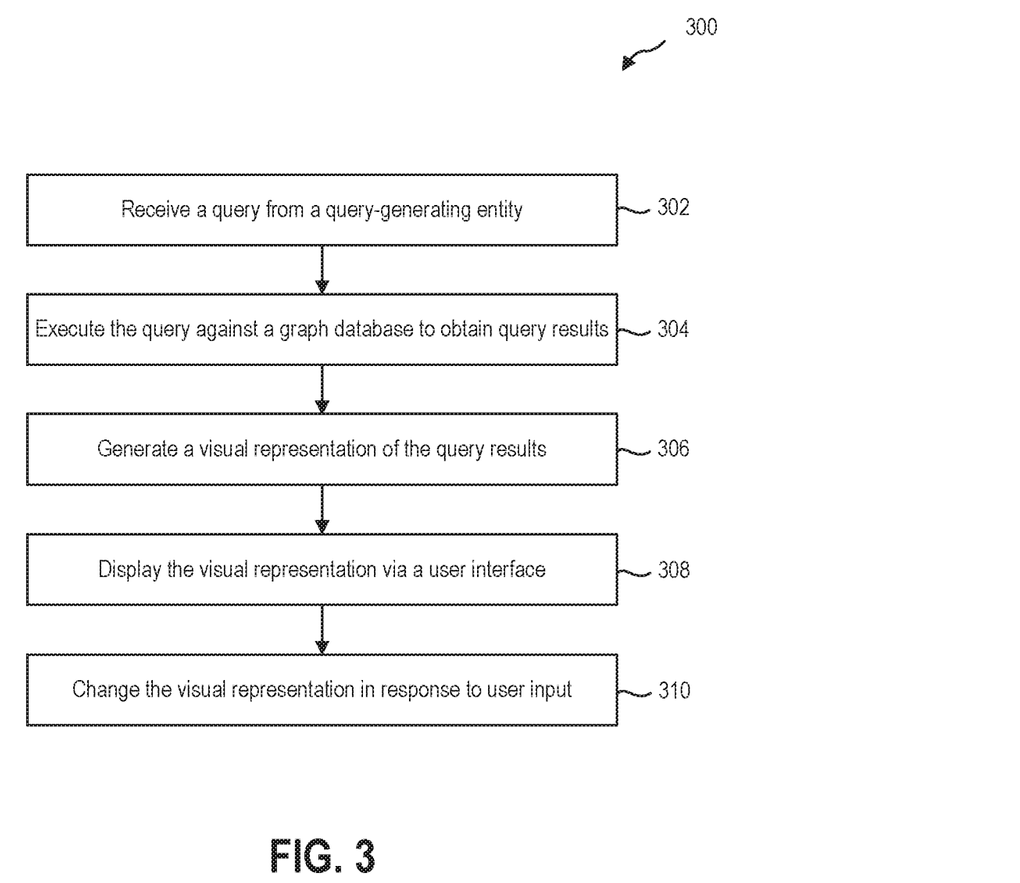
FIG. 3 is a flow diagram that illustrates an example of a method for providing a visual representation of query results for a graph database.

FIG. 3 is a flow diagram that illustrates an example of a method 300 for providing a visual representation 118 of a graph in accordance with the present disclosure. As indicated above, for purposes of example, the visual representation 118 will be discussed in the context of query results 116 for a graph database 106. However, the visualization techniques disclosed herein may be applied in a variety of other contexts, such as visually representing a graph that is loaded from a file.

A query 104 may be received 302 from a query-generating entity 102. The query 104 may be executed 304 against a graph database 106 to obtain query results 116. A visual representation 118 of the query results 116 may be generated 306 and displayed 308 via a user interface 120. The visual representation 118 of the query results 116 may be changed 310 in response to user input.

Figure 4:
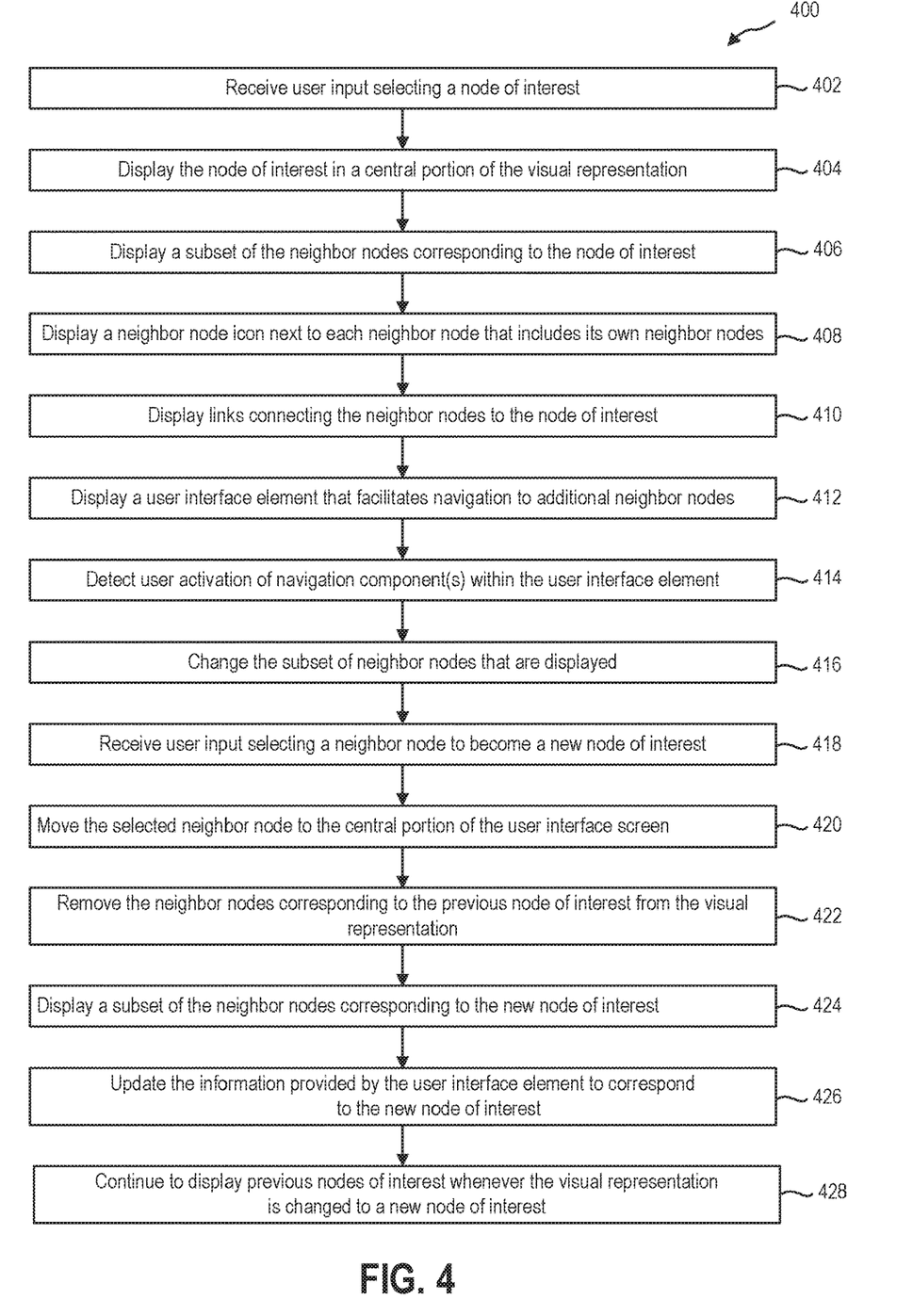
FIG. 4 is a flow diagram that illustrates an example of a method for displaying a visual representation of query results and changing the visual representation in response to user input.

FIG. 4 is a flow diagram that illustrates an example of a method 400 for displaying 308 a visual representation 118 of query results 116 and changing 310 the visual representation 118 in response to user input. In other words, the method 400 shown in FIG. 4 is an example of the last two operations 308, 310 in the method 300 of FIG. 3.

The query results 116 include a plurality of nodes 208. User input may be received 402 to select one of the nodes 208 as a node of interest 208a. The node of interest 208a may be displayed 404 in a central portion of a user interface screen 224a in which the visual representation 118 is being presented.

If the number of neighbor nodes 208 corresponding to the node of interest 208a is less than a defined maximum ($N_{max}$), then all of the neighbor nodes 208 may be displayed with the node of interest 208a. If, however, the number of neighbor nodes 208 corresponding to the node of interest 208a is greater than $N_{max}$, then only a subset of the neighbor nodes 208 may be displayed 406 with the node of interest 208a. A neighbor node indicator 230 may be displayed 408 next to each neighbor node 208 that corresponds to the current node of interest 208a and that includes one or more of its own neighbor nodes 208. Links 210 connecting the neighbor nodes 208 to the node of interest 208a may also be displayed 410.

A user interface element 222 may also be displayed 412. The user interface element 222 may provide information about the subset of neighbor nodes 208 that are currently being displayed (e.g., which neighbor nodes 208 are currently being displayed, the total number of neighbor nodes 208 that correspond to the current node of interest 208a). The user interface element 222 may also facilitate navigation to the additional neighbor nodes 208 that correspond to the current node of interest 208a but are not currently displayed. For example, the user interface element 222 may include one or more navigation components (e.g., a left arrow 226 and a right arrow 228, a scrollbar). In response to detecting 414 user activation of the navigation component (s), the subset of neighbor nodes 208 that are being displayed may be changed 416.

User input may be received 418 selecting a neighbor node 208b of the current node of interest 208a to become the new node of interest 208b. In response, the selected neighbor node 208b may be moved 420 to the central portion of the user interface screen 224c. The neighbor nodes 208 corresponding to the previous node of interest 208a may be removed 422 from the visual representation 118 (so that those neighbor nodes 208 are no longer displayed). A subset of the neighbor nodes 208 corresponding to the new node of interest 208b may be displayed 424 with the new node of interest 208b. The information provided by the user interface element 222 may be updated 426 to correspond to the new node of interest 208b.

As the user traverses the visual representation 118, the user may select many different nodes of interest 208a-c. The visual representation 118 may continue 428 to display some or all of the previous nodes of interest 208a-b whenever the visual representation 118 is changed to a new node of interest 208c.

Figure 5:
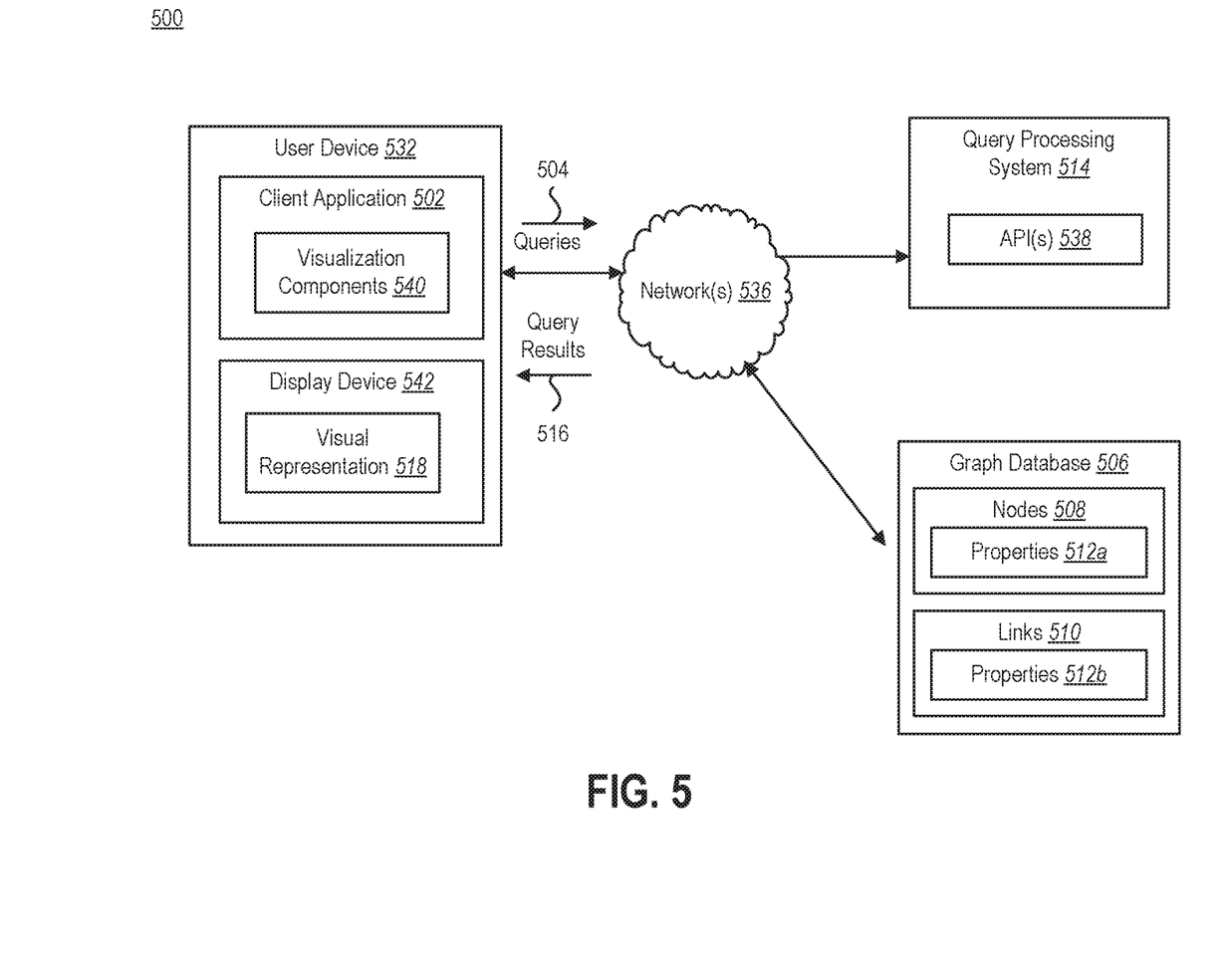
FIG. 5 is a block diagram that illustrates another example of a system in which aspects of the present disclosure may be utilized, including a user device in electronic communication with a query processing system.

FIG. 5 is a block diagram that illustrates another example of a system 500 in which aspects of the present disclosure may be utilized. The system 500 includes a user device 532, such as a personal computer, laptop computer, mobile device, or the like. The user device 532 may be in electronic communication with a query processing system 514 via one or more networks 536. In some embodiments, the network (s) 536 may include the Internet, and the query processing system 514 may be implemented as a cloud computing system.

The user device 532 may include a client application 502 that communicates with one or more application programming interfaces (APIs) 538 of the query processing system 514 in order to make queries 504 with respect to a graph database 506. As discussed above, the graph database 506 may include nodes 508 and links 510. The nodes 508 may include properties 512a, and the links 510 may include properties 512b. In some embodiments, the client application 502 may be a web browser that accesses the query processing system 514 via the Internet. Alternatively, the client application 502 may be another type of software application other than a web browser.

The query processing system 514 may execute one or more queries 504 against the graph database 506 to obtain query results 516, which may be returned to the user device 532. The client application 502 may include visualization components 540 that provide a visual representation 518 of the query results 516. The visual representation 518 may include some or all of the aspects of the visual representation 118 described above and shown in FIGS. 2A-F. The visual representation 518 may be displayed to the user via a display device 542 of the user device 532.

In the above discussion, reference was made to a "central portion" of a particular region, such as a user interface screen 224a. As used herein, the central portion of a region refers to a part of the region that is situated at or near the actual center of the region. For example, a node 208a may be deemed to be within the central portion of a user interface screen 224a if a rectangle can be drawn that satisfies the following two conditions. First, the rectangle includes both the node 208a and the actual center of the user interface screen 224a. Second, the area of the rectangle is no greater than x percent of the total area of the user interface screen 224a. In some embodiments, the value of x is 2. In other embodiments, the value of x is 5. In still further embodiments, the value of x is 10.

Figure 6:
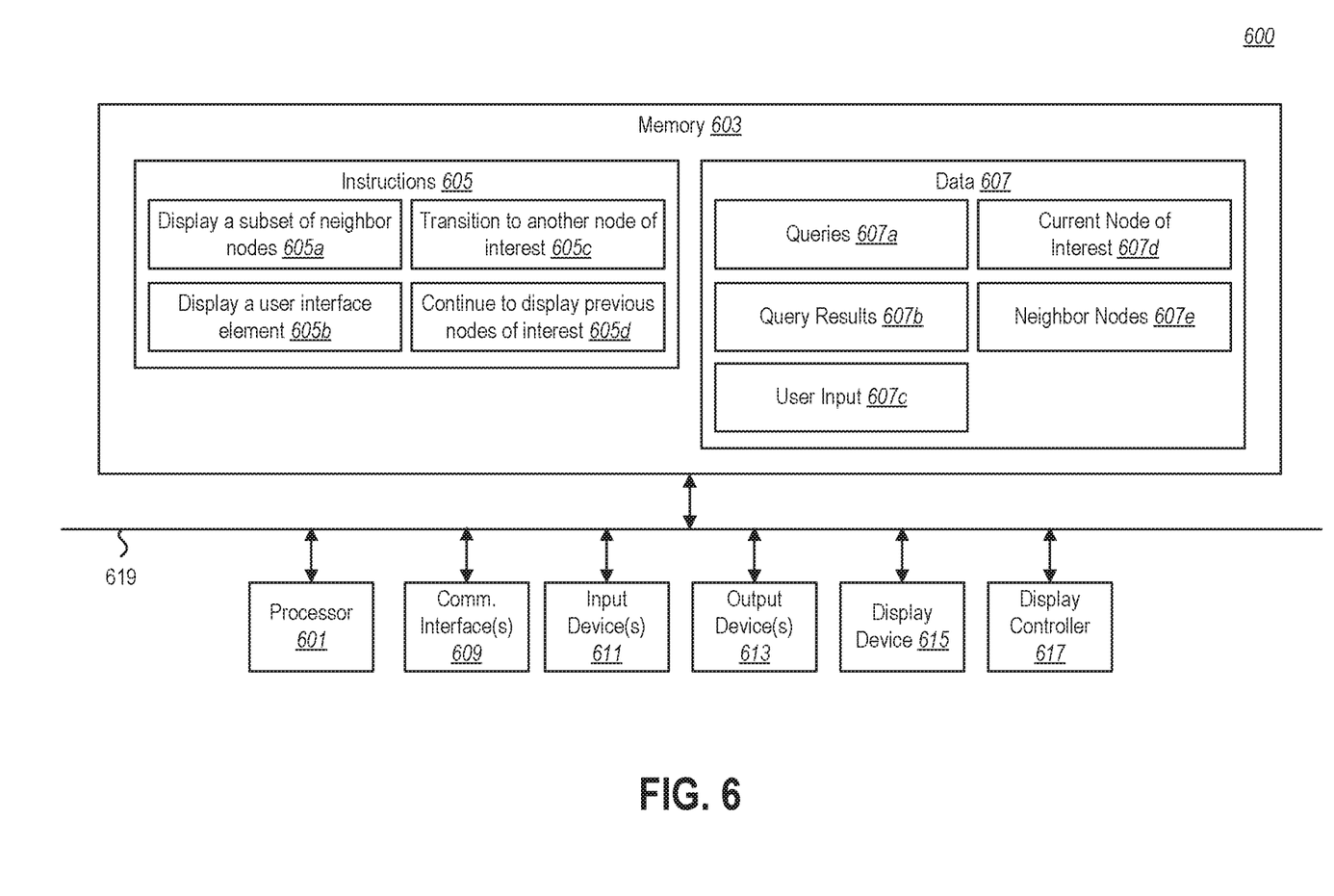
FIG. 6 illustrates certain components that may be included within a computer system.

FIG. 6 illustrates certain components that may be included within a computer system 600. One or more computer systems 600 may be used to implement the systems 100, 500 disclosed herein.

The computer system 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the methods 300, 400 disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

Some examples of instructions 605 that may be stored in the memory 603 and executed by the processor 601 include instructions 605a to display a subset of neighbor nodes 208 corresponding to a node of interest 208a, instructions 605b to display a user interface element 222 that facilitates navigation to additional neighbor nodes 208, instructions 605c to transition from one node of interest 208a to another node of interest 208b in the manner shown in FIGS. 2C-E, and instructions 605d to continue to display previous nodes of interest 208a-b when the visual representation 118 is changed to a new node of interest 208c. Some examples of data 607 that may be stored in the memory 603 and used in connection with executing the instructions 605 include queries 607a, query results 607b, user input 607c, a user selection 607d of a current node of interest 208a, and information 607e about neighbor nodes 208 corresponding to the current node of interest 208a.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics.

The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for providing a visual representation of a graph, comprising:
    displaying a current node of interest, the current node of interest comprising a first plurality of neighbor nodes;
    displaying a subset of the first plurality of neighbor nodes with the current node of interest;
    displaying links connecting the subset of the first plurality of neighbor nodes to the current node of interest;
    displaying a user interface element that facilitates navigation to additional neighbor nodes that correspond to the current node of interest but are not currently displayed, wherein the user interface element provides information to indicate how many neighbor nodes are included in the first plurality of neighbor nodes and which neighbor nodes of the first plurality of neighbor nodes are included in the subset of the first plurality of neighbor nodes that are currently displayed; and
    changing the subset of the first plurality of neighbor nodes that are displayed in response to user activation of a navigation component in the user interface element.

2. The method of claim 1, wherein the current node of interest is displayed in a central portion of a user interface screen, and further comprising:
    receiving user input selecting a neighbor node of the current node of interest as a new node of interest; and
    moving the selected neighbor node to the central portion of the user interface screen.

3. The method of claim 2, wherein the new node of interest comprises a second plurality of neighbor nodes, and further comprising:
    removing the subset of the first plurality of neighbor nodes from the visual representation;
    displaying a subset of the second plurality of neighbor nodes with the new node of interest; and
    updating the user interface element to provide information about the subset of the second plurality of neighbor nodes.

4. The method of claim 3, wherein an animated sequence is used to remove the subset of the first plurality of neighbor nodes and to display the subset of the second plurality of neighbor nodes.

5. The method of claim 1, further comprising continuing to display previous nodes of interest when the visual representation is changed to a new node of interest.

6. The method of claim 1, further comprising displaying a neighbor node indicator next to each neighbor node of the current node of interest that includes one or more neighbor nodes.

7. A computer system configured to provide a visual representation of a graph, comprising:
    one or more processors; and
    memory comprising instructions that are executable by the one or more processors to:
        display a current node of interest, the current node of interest comprising a first plurality of neighbor nodes;
        display a subset of the first plurality of neighbor nodes with the current node of interest;
        display links connecting the subset of the first plurality of neighbor nodes to the current node of interest;
        display a user interface element that facilitates navigation to additional neighbor nodes that correspond to the current node of interest but are not currently displayed, wherein the user interface element provides information to indicate how many neighbor nodes are included in the first plurality of neighbor nodes and which neighbor nodes of the first plurality of neighbor nodes are included in the subset of the first plurality of neighbor nodes that are currently displayed; and
        change the subset of the first plurality of neighbor nodes that are displayed in response to user activation of a navigation component in the user interface element.

8. The computer system of claim 7, wherein the current node of interest is displayed in a central portion of a user interface screen, and wherein the memory further comprises additional instructions that are executable by the one or more processors to:
    receive user input selecting a neighbor node of the current node of interest as a new node of interest; and
    move the selected neighbor node to the central portion of the user interface screen.

9. The computer system of claim 8, wherein the new node of interest comprises a second plurality of neighbor nodes, and wherein the memory further comprises additional instructions that are executable by the one or more processors to:
    remove the subset of the first plurality of neighbor nodes from the visual representation;
    display a subset of the second plurality of neighbor nodes with the new node of interest; and
    update the user interface element to provide information about the subset of the second plurality of neighbor nodes.

10. The computer system of claim 9, wherein an animated sequence is used to remove the subset of the first plurality of neighbor nodes and to display the subset of the second plurality of neighbor nodes.

11. The computer system of claim 7, wherein the memory further comprises additional instructions that are executable by the one or more processors to continue to display previous nodes of interest when the visual representation is changed to a new node of interest.

12. The computer system of claim 7, wherein the memory further comprises additional instructions that are executable by the one or more processors to display a neighbor node indicator next to each neighbor node of the current node of interest that includes one or more neighbor nodes.

13. A computer-readable medium having computer-executable instructions stored thereon for providing a visual representation of a graph, the instructions being executable by one or more processors to:
    display a current node of interest, the current node of interest comprising a first plurality of neighbor nodes;
    display a subset of the first plurality of neighbor nodes with the current node of interest;
    display links connecting the subset of the first plurality of neighbor nodes to the current node of interest;
    display a user interface element that facilitates navigation to additional neighbor nodes that correspond to the current node of interest but are not currently displayed, wherein the user interface element provides information to indicate how many neighbor nodes are included in the first plurality of neighbor nodes and which neighbor nodes of the first plurality of neighbor nodes are included in the subset of the first plurality of neighbor nodes that are currently displayed; and change the subset of the first plurality of neighbor nodes that are displayed in response to user activation of a navigation component in the user interface element.

14. The computer-readable medium of claim 13, wherein the current node of interest is displayed in a central portion of a user interface screen, and wherein the computer-readable medium further comprises additional instructions that are executable by the one or more processors to:

receive user input selecting a neighbor node of the current node of interest as a new node of interest; and move the selected neighbor node to the central portion of the user interface screen.

15. The computer-readable medium of claim 14, wherein the new node of interest comprises a second plurality of neighbor nodes, and wherein the computer-readable medium further comprises additional instructions that are executable by the one or more processors to:

remove the subset of the first plurality of neighbor nodes from the visual representation; and display a subset of the second plurality of neighbor nodes with the new node of interest.

16. The computer-readable medium of claim 13, wherein the computer-readable medium further comprises additional instructions that are executable by the one or more processors to continue to display previous nodes of interest when the visual representation is changed to a new node of interest.

\* \* \* \* \*